(12) United States Patent  
Taylor

(10) Patent No.: US 7,588,823 B2  
(45) Date of Patent: Sep. 15, 2009

(54) TRANSPARENT ARTICLES WITH ANTI-REFLECTIVE COATING AND METHODS OF MAKING THE SAME

(75) Inventor: Thomas J. Taylor, Northville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 309 days.

(21) Appl. No.: 11/491,088

(22) Filed: Jul. 24, 2006

(65) Prior Publication Data

US 2007/0031655 A1    Feb. 8, 2007

Related U.S. Application Data

(60) Provisional application No. 60/706,033, filed on Aug. 8, 2005.

(51) Int. Cl.
- *B05D 3/02* (2006.01)
- *B32B 17/10* (2006.01)
- *B32B 27/16* (2006.01)
- *B32B 27/30* (2006.01)
- *C08F 2/48* (2006.01)

(52) U.S. Cl. .............. 428/336; 428/421; 428/447; 428/448; 427/387; 427/407.2; 427/508

(58) Field of Classification Search .............. None
See application file for complete search history.

(56) References Cited

U.S. PATENT DOCUMENTS

| | | | |
|---|---|---|---|
| 4,440,882 A | 4/1984 | Weiss et al. | |
| 4,511,209 A * | 4/1985 | Skutnik | 385/145 |
| 5,059,451 A * | 10/1991 | Agou et al. | 427/164 |
| 5,449,558 A | 9/1995 | Hasegawa et al. | |
| 5,948,131 A | 9/1999 | Newman | |
| 6,692,832 B2 | 2/2004 | Murphy | |
| 2006/0093830 A1 * | 5/2006 | Karagiannis et al. | 428/421 |

FOREIGN PATENT DOCUMENTS

| | | |
|---|---|---|
| EP | 0 243 605 A2 | 11/1987 |
| EP | 1 136 973 A1 | 9/2001 |
| WO | 99/30188 | 6/1999 |

OTHER PUBLICATIONS

EP Search Report dated Aug. 27, 2008.

* cited by examiner

*Primary Examiner*—Ramsey Zacharia  
(74) *Attorney, Agent, or Firm*—Nixon & Vanderhye P.C.

(57) ABSTRACT

Anti-reflective (AR) coated transparent substrates and methods of making the same are provided wherein the AR coating includes a fluorinated polymer. Preferably, the anti-reflective transparent articles and methods of making the same include a transparent substrate (e.g., glass), and an anti-reflective coating formed of a fluorinated polymer on one (or both) surface(s) of the substrate. If coated on both surfaces of the glass sheet, the fluorinated polymer forming one of the coatings may be the same or different as compared to the fluorinated polymer forming the other coating. In especially preferred embodiments, the fluorinated polymer is the reaction product of at least one fluorinated acrylic ester monomer which is formed over an anchor layer of a hydrolyzed unsaturated alkyl silane adsorbed onto the substrate surface.

10 Claims, 2 Drawing Sheets

TRANSPARENT ARTICLES WITH ANTI-REFLECTIVE COATING AND METHODS OF MAKING THE SAME

CROSS-REFERENCE TO RELATED APPLICATION

This application is based on and claims domestic priority benefits under 35 USC §119(e) from U.S. Provisional Patent Application Ser. No. 60/706,033 filed on Aug. 8, 2005, the entire content of which is expressly incorporated hereinto by reference.

FIELD OF THE INVENTION

The present invention relates generally to coated transparent substrates and methods of coating the same. In preferred embodiments, the present invention relates to transparent substrates having an anti-reflective (AR) coating thereon.

BACKGROUND AND SUMMARY OF THE INVENTION

Glass is typically made of silicates that are melted to form a clear, transparent, solid material. The fundamental molecular structural unit of conventional glass is a $SiO_4$ tetrahedron. Ordinary float glass (named for its production process whereby a molten ribbon of glass is floated on molten metal to provide a smooth surface) includes additional amounts of soda ($Na_2O$), usually in the form of sodium carbonate or nitrate during the production process, lime (CaO) and other oxides (usually aluminum and magnesium oxides) to form a soda-lime-silica structure known colloquially as soda-lime glass. Other specialized glass can be prepared by the introduction of other additives and constituents.

Reflections in optical systems occur due to index of refraction (n) discontinuities. Complex layer structures are often deposited on glass substrates in an attempt to compensate for such index discontinuities.

Glass typically has an index of refraction of about 1.46 (i.e., n=1.46), while the index of refraction of air is about 1.0 Thus, given a glass substrate having a refractive index (n) of 1.46 and adjacent air having a refractive index (n) of 1.0, the most desirable index (n) for an AR coating can be calculated as follows:

$n$=square root of $(1.46 \times 1.0) = 1.23$

For an ideal single layer system, the coating would thus have a refractive index (n) of 1.23 and a thickness of around 100 nm for visible applications to 145 nm for photovoltaic applications.

Unfortunately, durable transparent coating materials having a refractive index (n) of 1.23 are not typically available. Because durable AR coatings having an index of about 1.23 are not typically available, those in the art have tried to provide for AR characteristics in other manners as exemplified by U.S. Pat. Nos. 5,948,131, 4,440,882, and 6,692,832 (the entire content of each being incorporated expressly hereinto by reference). For example, it has been proposed to use $MgF_2$ which has an index of refraction of 1.38 at 550 nm as an AR coating on transparent substrates. $MgF_2$ AR coatings tend to not be scratch or etch resistant and are not easily applied. In addition, such $MgF_2$ coatings typically have a reflectance of less than about 2% across most of the visible light wavelengths as compared to about 4% for uncoated soda lime glass.

While the prior techniques used in the art may in fact achieve improvements in the AR properties of transparent substrates, some techniques may be too expensive and/or burdensome. As such, a need still exists in the art for coated articles with improved AR characteristics, and methods of making the same. It is towards fulfilling such needs that the present invention is directed.

Broadly, the present invention is embodied in AR-coated transparent substrates and methods of making the same wherein the AR-coating comprises a fluorinated polymer. In especially preferred forms, the present invention is embodied in anti-reflective transparent articles and methods of making the same having a transparent substrate (e.g., glass), and an anti-reflective coating comprised of a fluorinated polymer on one (or both) surface(s) of the substrate. If coated on both surfaces of the transparent substrate, the fluorinated polymer forming one of the coatings may be the same or different as compared to the fluorinated polymer forming the other coating.

In especially preferred embodiments, the fluorinated polymer is the reaction product of at least one fluorinated acrylic ester monomer which is formed over an anchor layer of a hydrolyzed unsaturated alkyl silane adsorbed onto the substrate surface.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Preferred embodiments of this invention relate to coated articles which include an anti-reflective (AR) coating on a glass substrate, and methods of making the same. Such coated articles may be used in the context of, for example and without limitation, storefront windows, fireplace door/window glass, picture frame glass, architectural windows, residential windows, display glass, or in any other suitable application(s). An AR coating of a single layer is preferred in certain exemplary embodiments, although a multi-layer AR coating may be used in other embodiments of this invention.

Virtually any transparent substrate that is self-supporting may be coated in accordance with the present invention. Thus, rigid or flexible substrates formed of glass, plastics, ceramics and the like may be coated in accordance with the present invention. Most preferably, the substrate is glass, with conventional soda-lime float glass being especially preferred. By the term "transparent" is meant that the material is at least about 70%, more preferably at least about 85%, and most preferably at least about 90%, up to about 94%, transparent to visible light.

Figure 1:
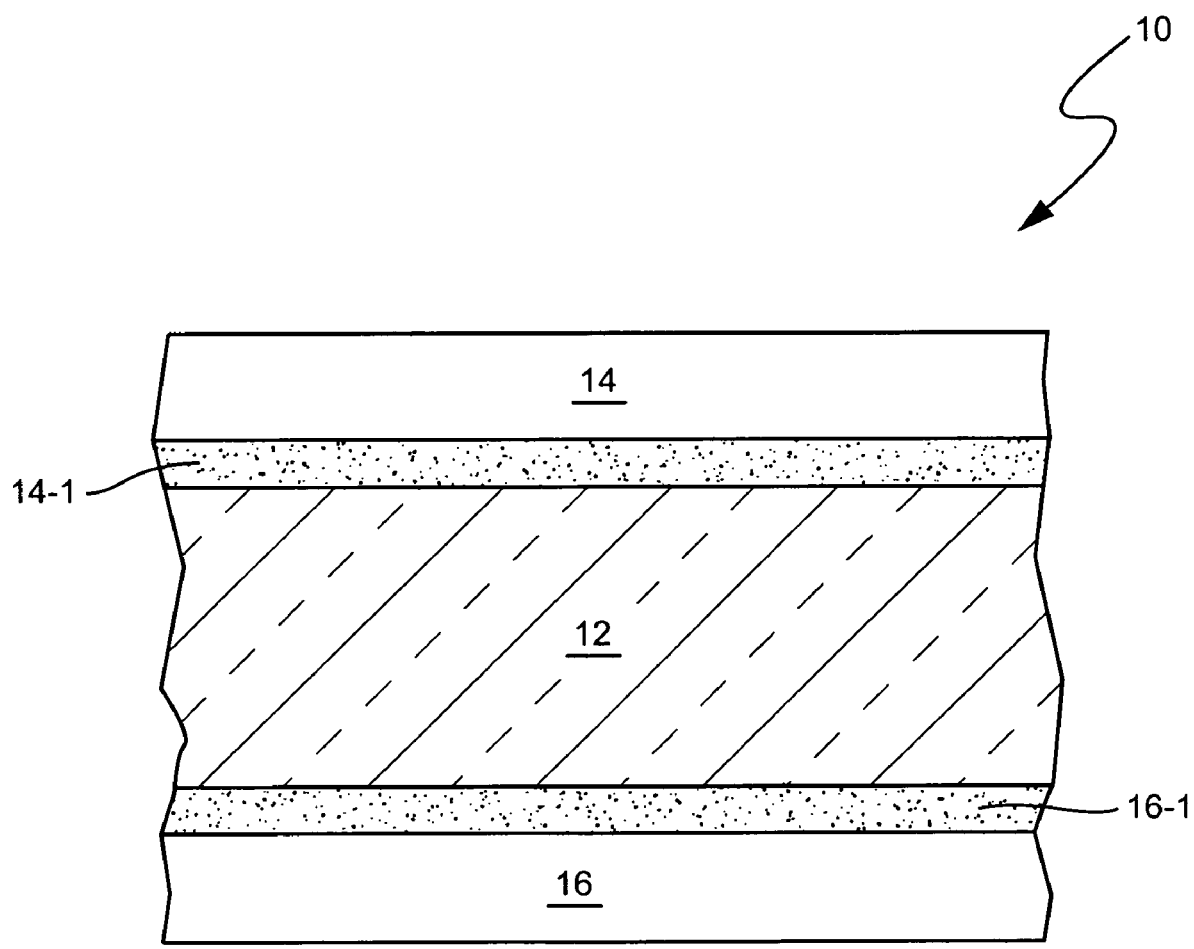
FIG. 1 is a greatly enlarged schematic cross-sectional view of a transparent article having anti-reflective coatings thereon.

In one particularly preferred embodiment of a coated substrate 10 in accordance with the present invention as shown in FIG. 1, a glass substrate 12 includes coating layers 14, 16 on each of its upper and lower surfaces, respectively. It is possible, however, to achieve AR properties with one of the coatings 14 or 16 on one of the upper or lower surfaces of the glass substrate 12. Each of the coatings 14 and 16 are applied onto an anchor layer 14-1 and 16-1, respectively, formed of a hydrolyzed unsaturated alkyl silane adsorbed onto a surface region of the glass substrate 12.

Each of the coatings 14 and 16 will exhibit an index of refraction between about 1.300 to about 1.500, preferably between about 1.350 to about 1.420. The relative thicknesses of the coatings are selected so that substantially minimal reflectance is obtained at a light wavelength of about 525 nm (+/−about 50 nm). The reflectance advantageously will be less than about 2.0%, more preferably less than about 1.5%, and most preferably less than about 1.0%, at light wavelengths of about 525 nm (+/−about 50 nm). That is, according to the present invention, the term "anti-reflective" is meant to refer to coatings having light reflectance of less than about 2.0%, more preferably less than about 1.5%, and most preferably less than about 1.0%, at wavelengths of between about 475 nm to about 575 nm. In this regard, thicknesses of the coatings 14 and/or 16 may be between about 50 to about 200 nm, more preferably between about 75 to about 150 nm, and most preferably between about 100 to about 120 nm.

Most preferably, each of the coatings 14 or 16, which may be the same or different, is formed of a fluorinated polymer. More specifically, the fluorinated polymer is a photopolymerized fluorinated monomer. In especially preferred embodiments, the fluorinated polymer is the photopolymerization reaction product of at least one or more fluorinated acrylic ester monomer with an acrylic or methacrylic acid.

Preferred fluorinated acrylic ester monomers that may be employed in the practice of the present invention include:

| | |
|---|---|
| $CH_2=C(H)COOCH_2CF_3$ | $n = 1.3506$ |
| $CH_2=C(CH_3)COOCH_2CF_3$ | $n = 1.3624$ |
| $CH_2=C(H)COOCH_2CF_2CF_2H$ | $n = 1.3629$ |
| $CH_2=C(CH_3)COOCH_2CF_2CF_2H$ | $n = 1.3738$ |
| $CH_2=C(H)COOCH(CF_3)_2$ | $n = 1.3164$ |
| $CH_2=C(CH_3)COOCH(CF_3)_2$ | $n = 1.3295$ |
| $CH_2=C(H)COOCH_2(CF_2)_3F$ | $n = 1.3289$ |
| $CH_2=C(CH_3)COOCH_2(CF_2)_3F$ | $n = 1.3407$ |
| $CH_2=C(H)COOCH_2(CF_2)_4H$ | $n = 1.3467$ |
| $CH_2=C(CH_3)COOCH_2(CF_2)_4H$ | $n = 1.3559$ |
| $CH_2=C(H)COOCH_2(CF_2)F$ | $n = 1.3280$ |
| $CH_2=C(CH_3)COOCH_2(CF_2)F$ | $n = 1.3320$ |
| $CH_2=C(H)COO(CH_2)_2(CF_2)_8F$ | $n = 1.3380$ |
| $CH_2=C(CH_3)COO(CH_2)_2(CF_2)_8F$ | $n = 1.3435$ |
| $CH_2=C(H)COOCH_2CF(CF_3)OCF_2(CF_3)O(CF_2)_4F$ | $n = 1.3110$ |
| $CH_2=C(CH_3)COOCH_2CF(CF_3)OCF_2(CF_3)O(CF_2)_4F$ | $n = 1.3110$ |
| $(CF_3)_2(CO_2CF=CF)$ | $n = 1.3000$ |

A liquid reaction mixture to be applied onto one or both surfaces of a transparent substrate will typically contain (based on 100 parts by weight of the mixture) at least about 85 parts by weight, more preferably at least about 90 parts by weight, and most preferably at least about 95 parts by weight, of at least one fluorinated acrylic ester monomer. Acrylic acid may optionally be present in the reaction mixture in an amount (based on 100 parts by weight of the mixture) of about 5 parts by weight or less, more preferably about 2.5 parts by weight or less, and most preferably about 2.0 parts by weight or less, as a modifier to change the physical properties of the final polymerized reaction product.

Any suitable cross-linking agent may be employed in the practice of this invention so as to cross-link the fluorinated acrylic ester monomer(s) present in the reaction mixture. Thus, virtually any cross-linking agent may be employed in the practice of this invention, including for example, ethyleneglycodiacrylate, tetra(ethyleneglycol)dimethacrylate and trimethylopropane trimethacrylate. A presently preferred cross-linking agent is ethyleneglycol dimethacrylate. Typically, the cross-linking agent will be present in the reaction mixture in an amount between about 0.25 to about 2.5 parts by weight, preferably between about 0.50 to about 1.5 parts by weight, and most preferably in an amount of about 1.0 part by weight.

The reaction mixtures in accordance with the present invention will necessarily include a photoinitiator. Virtually any photoinitiator suitable for initiating reaction of the fluorinated acrylic ester monomer(s) present in the reaction mixture may be employed including, for example, p-xylenebis(N,N-diethyldithiocarbamate), 2-hydroxy-2-methyl-propiophenone and 1-hydroxycyclohexyl phenyl ketone. A preferred photoinitiator is p-xylenebis(N,N-diethyldithiocarbamate). The photoinitiator will typically be present in the reaction mixture in an amount (based on 100 parts by weight of the mixture) between about 0.1 to about 1.0 parts by weight, preferably between about 0.25 to about 0.75 parts by weight, and most preferably about 0.50 parts by weight.

One particularly preferred liquid reaction mixture that may be employed in the practice of the present invention comprises (based on 100 parts by weight of the mixture), about 96 parts of at least one fluorinated acrylic ester monomer, about 2 parts of acrylic acid as a coating modifier, about 1 part of ethyleneglycol dimethacrylate as a cross-linking agent, and about 0.5 part of p-xylenebis(N,N-diethyldithiocarbamate) as a photoinitiator.

Figure 2:
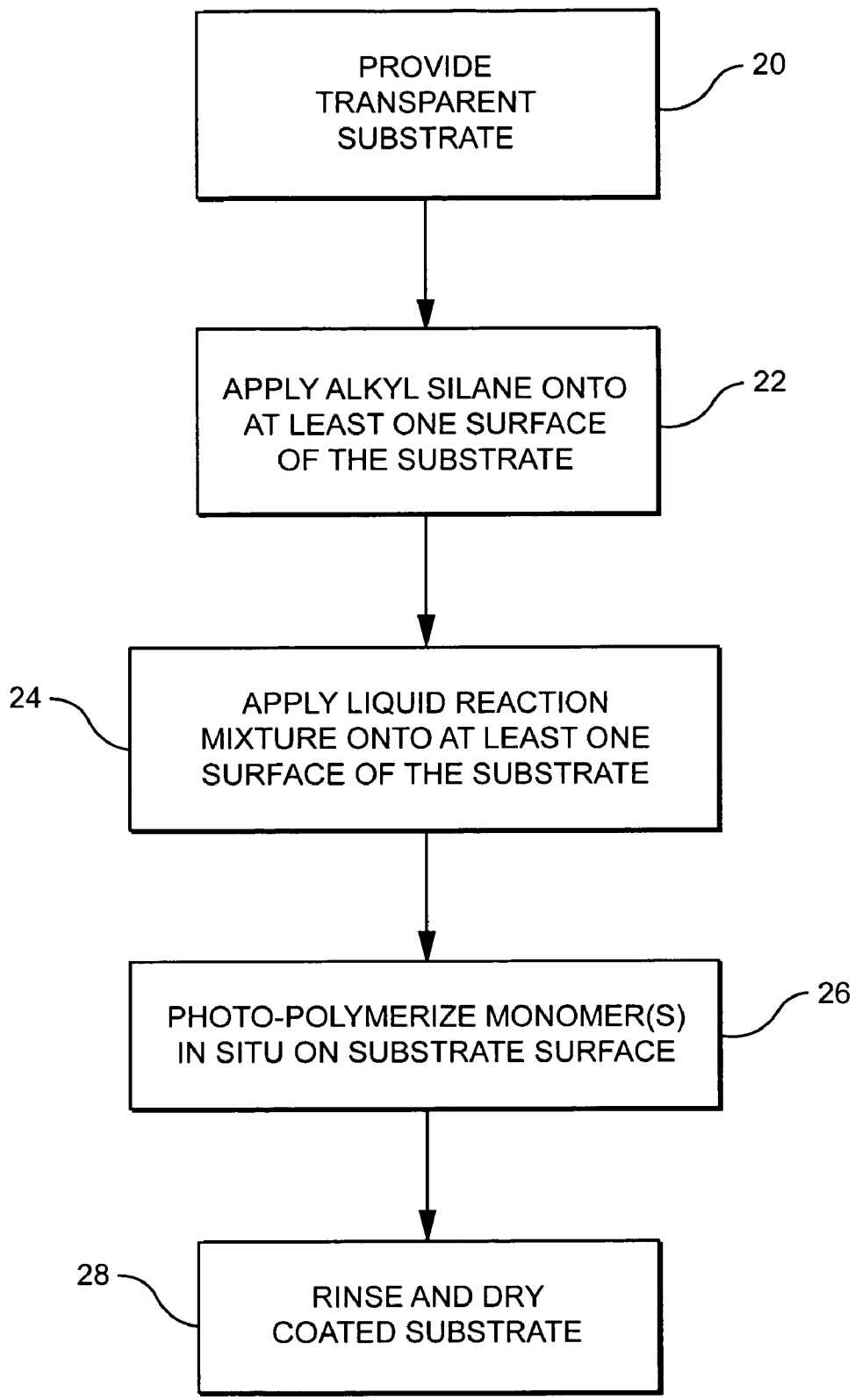
FIG. 2 is flowchart illustrating certain exemplary steps that may be practiced to obtain the transparent article depicted in FIG. 1.

Accompanying FIG. 2 shows schematically preferred steps to be practiced in making an AR-coated transparent substrate according to the present invention. In this regard, a transparent substrate to be coated is provided in step 20. As noted previously, the transparent substrate may be virtually any transparent self-supporting (e.g., rigid or flexible) member that may be formed of glass, plastics, ceramics and the like. Glass is preferred as a substrate for receiving an AR coating.

An aqueous solution comprising a hydrolyzed unsaturated alkyl silane may then be applied in step 22 onto one (or both) surface(s) of the transparent substrate. Presently preferred silanes include mono, di and trialkoxy silanes, such as vinyl triethoxy silane, propyl methacrylate trimethoxy silane and methyl methacrylate trimethoxy silane. Preferably, the silane is dissolved in water and allowed to hydrolyze so as to form an unsaturated alkoxy silane derivative. The silane-containing solution may be applied onto the surface(s) of the substrate in any convenient manner, such as by spraying, dipping, rolling, curtain coating, and the like. The silane-containing solution is maintained in physical contact with the surface(s) of the substrate for several seconds to several minutes sufficient to allow its adsorption into a surface region thereof. The amount of time needed for such adsorption will depend on the pH of the solution and its temperature of application.

The liquid reaction mixture may then be applied in step 24 to one (or both) surface(s) of the silane treated transparent substrate. Coating of the substrate can be accomplished by any conventional technique, such as roll coating, curtain coating, spraying, padding, dipping and the like. The coating technique will determine to a large extent the thickness of the coating on the transparent substrate.

The transparent substrate with the coating of the liquid reaction mixture on its surface(s) may then be subjected in step 26 to UV radiation so as to photo-polymerize the monomer(s) in the mixture. The concentration of the monomer(s) in the reaction mixture will determine in large part the possible maximum thickness of the final polymer coating. Thus, the final achieved thickness of the AR coating on the surface(s) of the transparent substrate will be determined by monomer concentration, UV irradiance time and the coating technique employed to apply a coating of the liquid reaction mixture.

Following the photo-polymerization to form the AR polymer coating, the coated substrate in step 28 may be rinsed to remove unreacted materials and any polymer material that is unattached to the substrate. The rinsed coated substrate may then be dried and packaged for shipment and/or use.

While the invention has been described in connection with what is presently considered to be the most practical and preferred embodiment, it is to be understood that the invention is not to be limited to the disclosed embodiment, but on the contrary, is intended to cover various modifications and equivalent arrangements thereof.

What is claimed is:

1. A method of making an anti-reflective transparent article comprising the steps of:
    (a) applying onto at least one surface of a transparent substrate an aqueous solution consisting essentially of a hydrolyzed unsaturated alkyl silane and allowing the aqueous solution to be in contact with the at least one surface of the transparent substrate for a time sufficient to allow the hydrolyzed unsaturated alkyl silane to be adsorbed into the at least one surface thereof and form an anchor layer thereon;
    (b) applying a liquid reaction mixture onto a surface of the anchor layer, wherein the liquid reaction mixture is comprised of at least one fluorinated alkyl ester monomer in the presence of an acrylic acid, an ethyleneglycol diacrylate cross-linker and a photoinitiator; and
    (c) photopolymerizing the liquid reaction mixture to form a polymeric anti-reflective coating on the anchor layer.

2. The method of claim 1, wherein the substrate is a glass sheet having opposed surfaces, and wherein steps (a)-(c) are practiced by applying a coating onto both of the opposed surfaces of the glass sheet.

3. The method of claim 1, wherein steps (a)-(c) are practiced to achieve a coating thickness of between about 50 nm to about 200 nm.

4. The method of claim 1, wherein the at least one fluorinated alkyl ester monomer is selected from the group consisting of:

CH2=C(H)COOCH2CF3

CH2=C(CH3)COOCH2CF3

CH2=C(H)COOCH2CF2CF2H

CH2=C(CH3)COOCH2CF2CF2H

CH2=C(H)COOCH(CF3)2

CH2=C(CH3)COOCH(CF3)2

CH2=C(H)COOCH2(CF2)3F

CH2=C(CH3)COOCH2(CF2)3F

CH2=C(H)COOCH2(CF2)4H

CH2=C(CH3)COOCH2(CF2)4H

CH2=C(H)COOCH2(CF2)F

CH2=C(CH3)COOCH2(CF2)F

CH2=C(H)COO(CH2)2(CF2)8F

CH2=C(CH3)COO(CH2)2(CF2)8F

CH2=C(H)COOCH2CF(CF3)OCF2(CF3)O(CF2)4F

CH2=C(CH3)COOCH2CF(CF3)OCF2(CF3)O(CF2)4F (CF3)2(CO2CF=CF).

5. An anti-reflective transparent article comprising:
a transparent substrate,
an anchor layer adsorbed onto at least one surface of the transparent substrate, and
an anti-reflective coating applied onto a surface of the anchor layer, wherein
the anchor layer consists essentially of an unsaturated alkyl silane, and wherein
the anti-reflective coating is a photopolymerized reaction product comprised of at least one fluorinated alkyl ester monomer in the presence of an acrylic acid, an ethyleneglycol diacrylate cross-linker and a photoinitiator.

6. An article as in claim 5, wherein the liquid reaction mixture comprises at least about 85 parts by weight of the at least one fluorinated alkyl ester monomer, about 5 parts by weight or less of the acrylic acid, between about 0.25 to 2.5 parts by weight of the ethyleneglycol diacrylate cross—linker, and between about 0.1 to about 1.0 parts by weight of the photoinitiator, based on 100 parts by weight of the liquid reaction mixture.

7. An article as in claim 6, wherein the liquid reaction mixture comprises about 96 parts by with of the fluorinated alkyl monomer, about 2 parts by weight of acrylic acid, about 1 part of ethyleneglycol dimethacrylate, and about 0.5 part of p-xylenebis(N,N-diethyldithiocarbamate).

8. An article as in claim 5, wherein the transparent substrate is a glass sheet having an anti-reflective coating comprised of the photopolymerized reaction product, which may be the same or different, on the opposed surfaces thereof.

9. An article as in claim 5, wherein the anti-reflective coating has a thickness of between about 50 nm to about 200 nm.

10. An article as in claim 5, wherein the at least one fluorinated alkyl ester monomer is selected from the group consisting of:

CH2=C(H)COOCH2CF3

CH2=C(CH3)COOCH2CF3

CH2=C(H)COOCH2CF2CF2H

CH2=C(CH3)COOCH2CF2CF2H

CH2=C(H)COOCH(CF3)2

CH2=C(CH3)COOCH(CF3)2

CH2=C(H)COOCH2(CF2)3F

CH2=C(CH3)COOCH2(CF2)3F

CH2=C(H)COOCH2(CF2)4H

CH2=C(CH3)COOCH2(CF2)4H

CH2=C(H)COOCH2(CF2)F

CH2=C(CH3)COOCH2(CF2)F

CH2=C(H)COO(CH2)2(CF2)8F

CH2=C(CH3)COO(CH2)2(CF2)8F

CH2=C(H)COOCH2CF(CF3)OCF2(CF3)O(CF2)4F

CH2=C(CH3)COOCH2CF(CF3)OCF2(CF3)O(CF2)4F (CF3)2(CO2CF=CF).

* * * * *